(No Model.)
W. S. HOLLAND.
VELOCIPEDE.
No. 285,035. Patented Sept. 18, 1883.
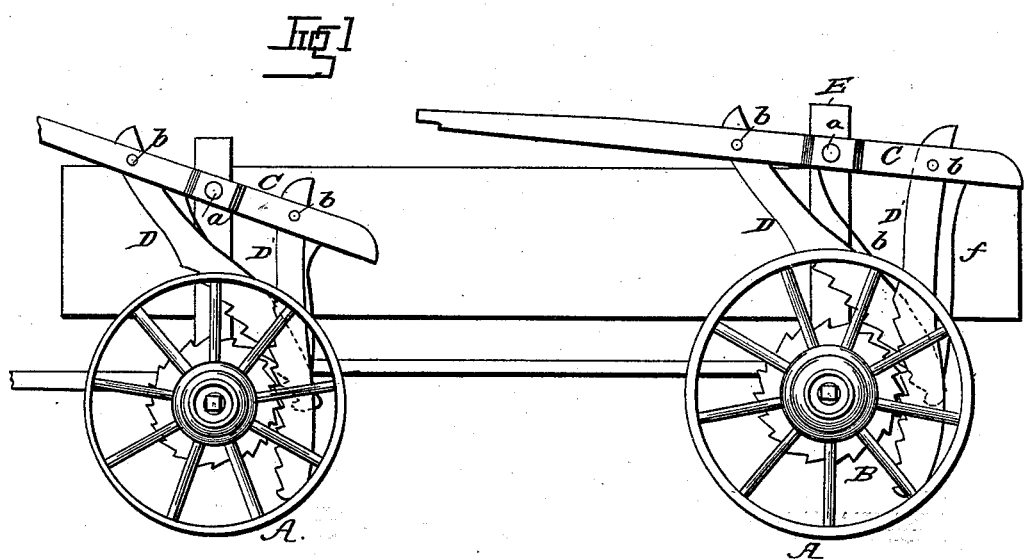
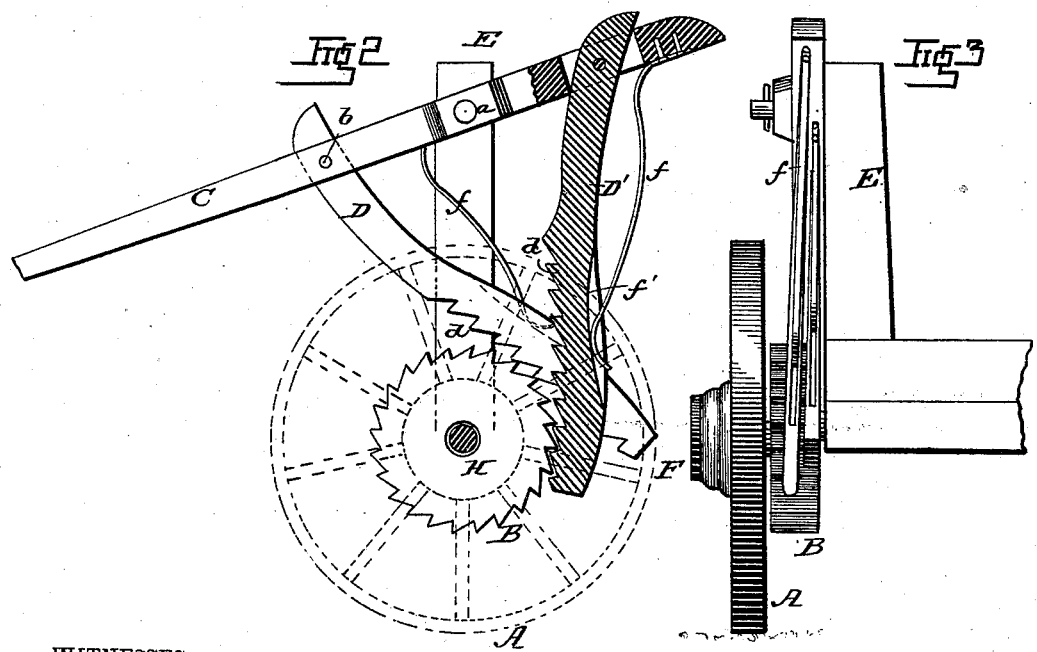
WITNESSES:
Fred. G. Dieterich.
Jno. G. Hinkel
INVENTOR.
W. S. Holland
By J. H. MacDonald
ATTORNEY

UNITED STATES PATENT OFFICE.

WILEY S. HOLLAND, OF GATEWOOD, MISSOURI.

VELOCIPEDE.

SPECIFICATION forming part of Letters Patent No. 285,035, dated September 18, 1883.

Application filed April 26, 1883. (No model.)

*To all whom it may concern:*

Be it known that I, W. S. HOLLAND, a citizen of the United States, residing at Gatewood, in the county of Ripley and State of Missouri, have invented certain new and useful Improvements in Motors, of which the following is a specification, reference being had therein to the accompanying drawings.

My invention relates to improvements in motors for actuating vehicles, cars, boats, &c.; and it consists in certain details and novel features of construction and arrangement of the several parts, as will be hereinafter more fully set forth in the specification and pointed out in the accompanying drawings, in which—

Figure 1 is a side elevation of a vehicle with my motor attached thereto; Fig. 2, an elevation, partly in section, of the motor attached to the vehicle; and Fig. 3 an end view of same.

The object of the device is to provide a motor that can be easily and economically attached to the vehicles, &c.; and it consists, primarily, in a lever having two pawls engaging with a ratchet-wheel, said pawls being pivotally secured to the lever, and the ratchet-wheel secured to a shoulder on the hub of the wheel or driving-shaft of a boat, &c.

Referring more particularly to the drawings, A represents the wheels of an ordinary vehicle, to the hub of which a ratchet-wheel, B, is suitably secured in any well-known way. I preferably cut a square shoulder on the inside of the hub and place the wheel on this shoulder. A lever, C, is pivoted at *a* to the standard E, said lever having pivoted to it on each side, as indicated at *b*, the ratchet-bars D D'. These bars project up through slots in lever C, and are notched on their under side, to engage with the serrations on the ratchet-wheel B. They are also grooved at *f'* on their upper sides, to receive the free ends of springs *f*, the opposite ends of said springs being secured to the lever C. The object of these springs is to cause a constant engagement of the ratchet-bars with the ratchet-wheel.

The operation of the device is as follows: As the lever C is moved up and down, one of the bars D D' is brought into engagement with the ratchet-wheel B, the other bar moving over the ratchet-teeth of B, so that when one bar has completed its movement upward the other has passed downward over the teeth and is ready to take hold and lift. For illustration, I have shown in Fig. 2 the lever C depressed. The bar D' is engaged with the ratchet-wheel and is lifting upward, the bar D being pushed downward in a reverse direction and passes over the teeth on B, and as soon as the lever C is raised the teeth of bar D are ready to take hold of the wheel and lift, the teeth of bar D' now passing over the ratchet-wheel. During this operation the springs *f* hold the bars firmly down. As the ratchet-wheel is thus turned the wheel A also turns.

I can utilize my device in propelling boats, hand-cars, saw-mill cars for moving logs or lumber, and for various other motive purposes.

I may attach the device to each wheel, or place one in front and one in rear, as may be deemed expedient and essential.

The lever C can be attached in any suitable way.

Having thus described my invention, what I claim, and desire to secure by Letters Patent, is—

In a motor for vehicles, the combination, with the ratchet-wheel B, secured to the wheel hub or shaft, of the actuating-lever C, pivoted as described, and the ratchet-bars D D', serrated and grooved, as described, and provided with springs *f* to enter the grooves on the upper side of said bars, the springs being secured to the actuating-lever, substantially as described, and for the purpose set forth.

In testimony whereof I affix my signature in presence of two witnesses.

WILEY S. HOLLAND.

Witnesses:
JAMES T. ONAEL,
A. J. McCOLLUM.